United States Patent
Moulin

(10) Patent No.: US 7,874,830 B2
(45) Date of Patent: Jan. 25, 2011

(54) METHOD FOR CLOSING A MOLDED BOTTLE CAP

(75) Inventor: Jacky Moulin, Sainte Marie Laumont (FR)

(73) Assignee: Moulindustrie, Sainte Marie Laumont (FR)

( * ) Notice: Subject to any disclaimer, the term of this patent is extended or adjusted under 35 U.S.C. 154(b) by 302 days.

(21) Appl. No.: 12/239,062

(22) Filed: Sep. 26, 2008

(65) Prior Publication Data

US 2009/0084071 A1   Apr. 2, 2009

(30) Foreign Application Priority Data

Sep. 26, 2007   (FR) ................................ 07 06738

(51) Int. Cl.
  B29C 45/40   (2006.01)
  B29C 65/56   (2006.01)
(52) U.S. Cl. .................. 425/317; 425/444; 425/556; 264/238; 264/255; 264/241
(58) Field of Classification Search ............... 425/130, 425/441–445, 517, 556, 539, 317; 264/239, 264/241–242, 255, 238
See application file for complete search history.

(56) References Cited

U.S. PATENT DOCUMENTS

| | | | | |
|---|---|---|---|---|
| 3,734,666 | A | * | 5/1973 | Guest et al. .................. 425/186 |
| 4,040,595 | A | * | 8/1977 | Tecco .......................... 425/556 |
| 4,340,352 | A |   | 7/1982 | Hayberg |
| 4,818,208 | A | * | 4/1989 | Byrne ......................... 425/394 |
| 5,906,841 | A |   | 5/1999 | Bak |
| 7,351,050 | B2 | * | 4/2008 | Vanderploeg et al. ....... 425/444 |
| 7,470,387 | B2 | * | 12/2008 | Chiu .......................... 425/556 |
| 2006/0254023 | A1 |   | 11/2006 | Chiu |

FOREIGN PATENT DOCUMENTS

| | | |
|---|---|---|
| CA | 2505287 A1 | 10/2006 |
| EP | 1649998 A | 4/2006 |
| WO | WO 02/28622 | 4/2002 |
| WO | WO 02/28622 A1 | 4/2002 |
| WO | WO 2006/074535 A | 7/2006 |

* cited by examiner

*Primary Examiner*—Joseph S Del Sole
*Assistant Examiner*—Thu Khanh T Nguyen
(74) *Attorney, Agent, or Firm*—Gerald E. Helget; Nelson R. Capes; Briggs and Morgan, P.A.

(57) ABSTRACT

The invention concerns a closure system (100) for molded caps comprising:
  two guide rails (102),
  a carriage (108) able to move on each rail (102),
  a closure bar (110) disposed between the two carriages (108),
  two wheels (116a, 116b), each mounted on a carriage (108), able to move in rotation about a rotation axis and each end of the bar (110) being mounted on one of the wheels (116a, 116b) so as to be offset with respect to said axis,
  a rack designed to move parallel to the rail (102),
  for each wheel (116a, 116b), a maneuvering gear able to move in rotation, secured to and coaxial with the wheel (116a, 116b) and designed to mesh with the rack,
  for each carriage (108), a locking device (106) designed to lock the carriage (108) with the rack and the guide rail (102),
  for each rack, an activation device (104).

5 Claims, 4 Drawing Sheets

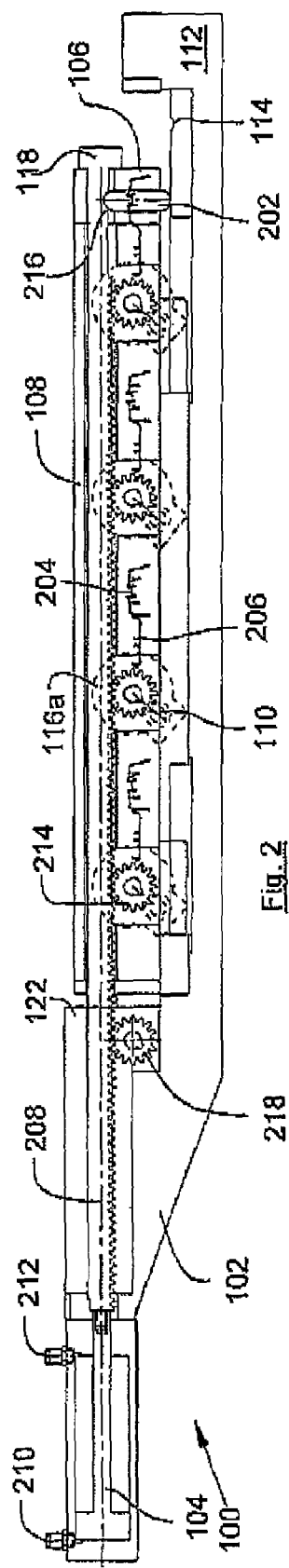
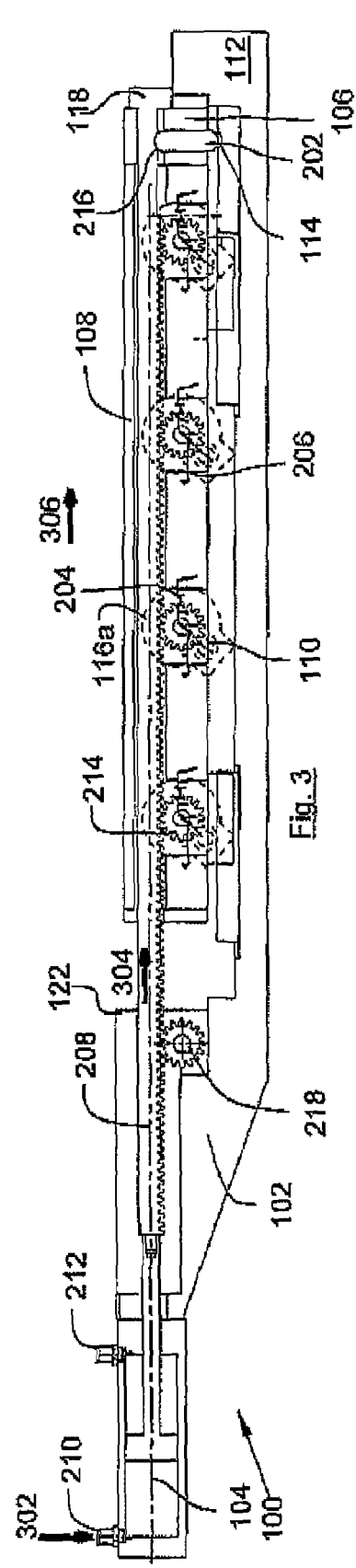
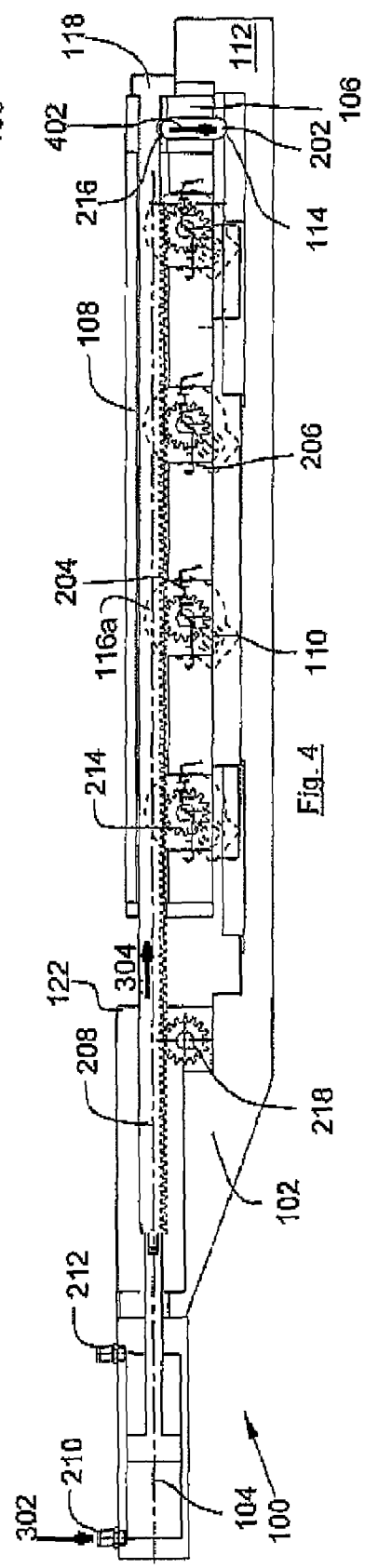
Fig. 2
Fig. 3
Fig. 4

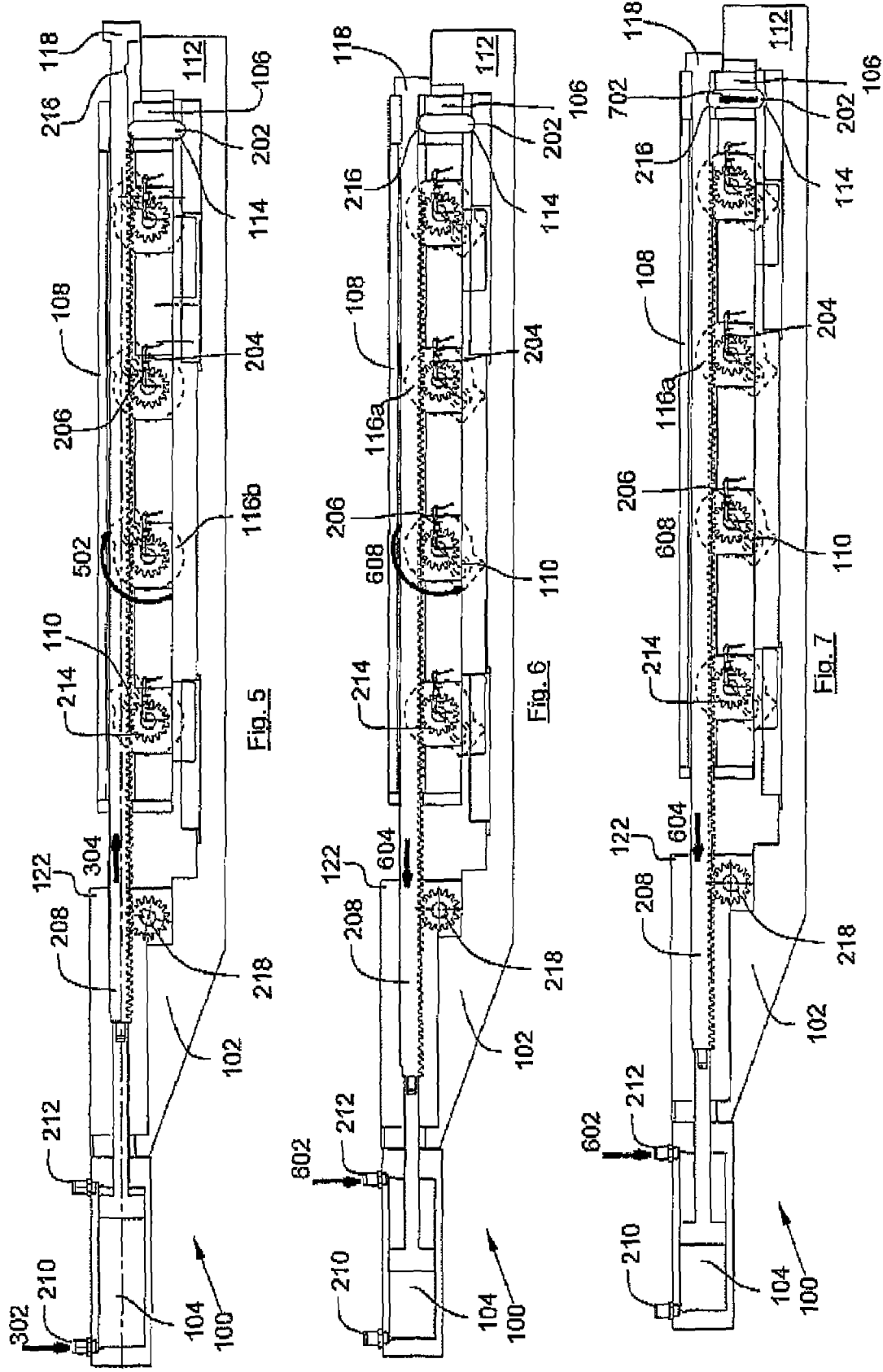

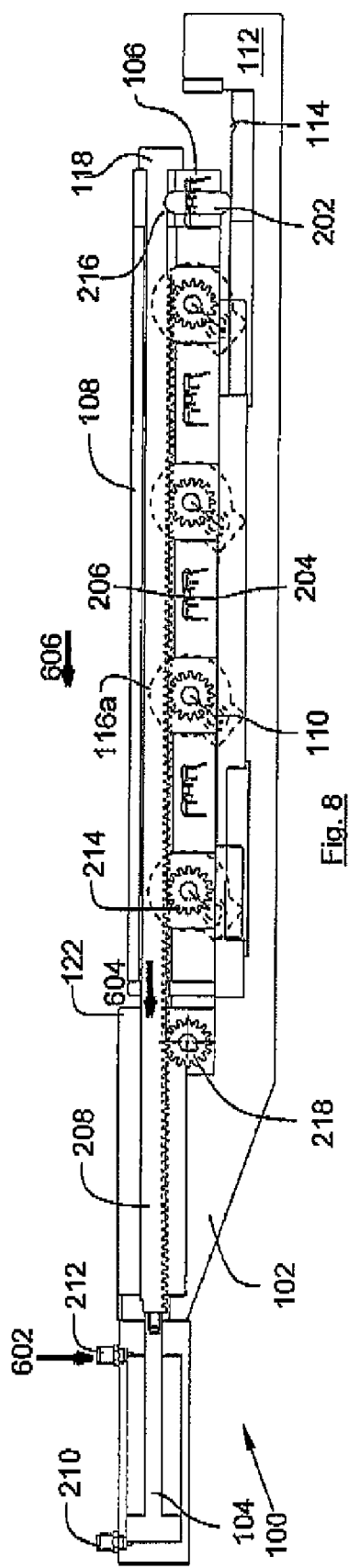
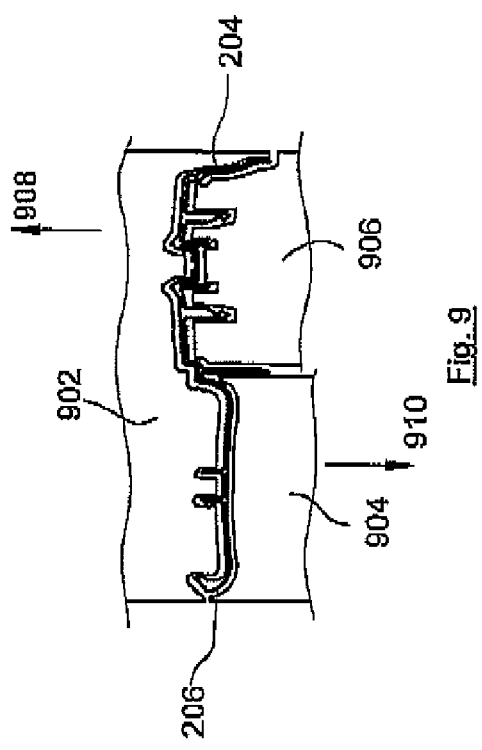
Fig. 8
Fig. 9

METHOD FOR CLOSING A MOLDED BOTTLE CAP

CROSS REFERENCE TO RELATED APPLICATIONS

The present application is based on and claims priority to French Patent Application No. 07/06738 filed on Sep. 26, 2007, the contents of which is hereby incorporated by reference in its entirety.

BACKGROUND OF THE INVENTION

A cap of the type for a bottle such as a shampoo, conditioner, washing-up product or the like generally has a body, a lid and a hinge connecting said body to said lid. The whole forms a single-piece assembly. The body is intended to fit on the bottle and the lid is intended to be maneuvered from a closed position to an open position and vice versa around the hinge.

Such a cap is molded in the open position and, before it is ejected from the mold, the lid must be returned to the closed position in order to facilitate subsequent handling.

For this purpose, various closure systems have been developed to close the caps before they are ejected from the mold. These systems are complicated and require the use of numerous mechanical actuators such as motors or cylinders that must be synchronised and maneuvered in concert in order to obtain the expected result.

SUMMARY OF THE INVENTION

An object of the present invention is to propose a closure system for molded caps that does not have the drawbacks of the prior art.

To this end, there is proposed a closure system for molded caps formed by a body, a lid and a hinge, the closure system comprising:

two parallel guide rails,
for each guide rail, a carriage mounted so as to be able to move in translation on the guide rail between a downstream stop and an upstream stop,
at least one closure bar disposed between the two carriages,
for the or each closure bar, two wheels, each being mounted on one of the carriages, able to move in rotation about a rotation axis perpendicular to the direction of movement of the carriages and each end of said closure bar being mounted on one of the wheels so as to be off-center with respect to said rotation axis,
for each carriage, a rack designed to move parallel to said guide rail,
for each wheel, a maneuvering gear able to move in rotation about said rotation axis, secured to and coaxial with said wheel and designed to mesh with the rack,
for each carriage, a locking device designed to lock said carriage alternately with the rack and the guide rail,
for each rack, an activation device designed to move said rack firstly in a first direction so as to bring each carriage in abutment against its upstream stop when the locking device locks said carriage with the rack, and then, when the locking device locks said carriage with said guide rail, so as to make each maneuvering gear undergo a rotation that brings each closure bar from a first position to a second position, a movement during which each closure bar drives the lid from the open position to the closed position, and secondly in a second direction so as, when the locking device locks said carriage with said guide rail, to make each maneuvering gear undergo a rotation that returns each closure bar from its second position to its first position, and then, when the locking device locks said carriage with the rack, so as to bring each carriage in abutment against its downstream stop.

Advantageously, when the closure bars are rotated, for each closure bar, the rotation axis of the closure bar is substantially merged with the axis of the hinge of the caps that are closed by said closure bar.

Advantageously, the locking device comprises a latch, a first locking groove produced on the rack and a second locking groove produced on the guide rail, and the latch is designed to engage alternately in the first locking groove or the second locking groove.

Advantageously, the latch takes the form of an oblong element and, when a first end with radius cooperates with the first locking groove, the second end with radius is in abutment on a surface of the guide rail, and, when the second end with radius cooperates with the second locking groove, the first end with radius is in abutment on a surface of the rack.

Advantageously, each activation device is a pneumatic cylinder.

BRIEF DESCRIPTION OF THE DRAWINGS

The characteristics of the invention mentioned above, as well as others, will emerge more clearly from a reading of the following description of an example embodiment, said description being given in relation to the accompanying drawings, among which:

FIGS. 2 to 8 depict the various operating steps of the closure system according to the invention, and FIG. 9 depicts an embodiment of the cavities for molding a cap.

DETAILED DESCRIPTION OF ILLUSTRATIVE EMBODIMENTS

Figure 1:
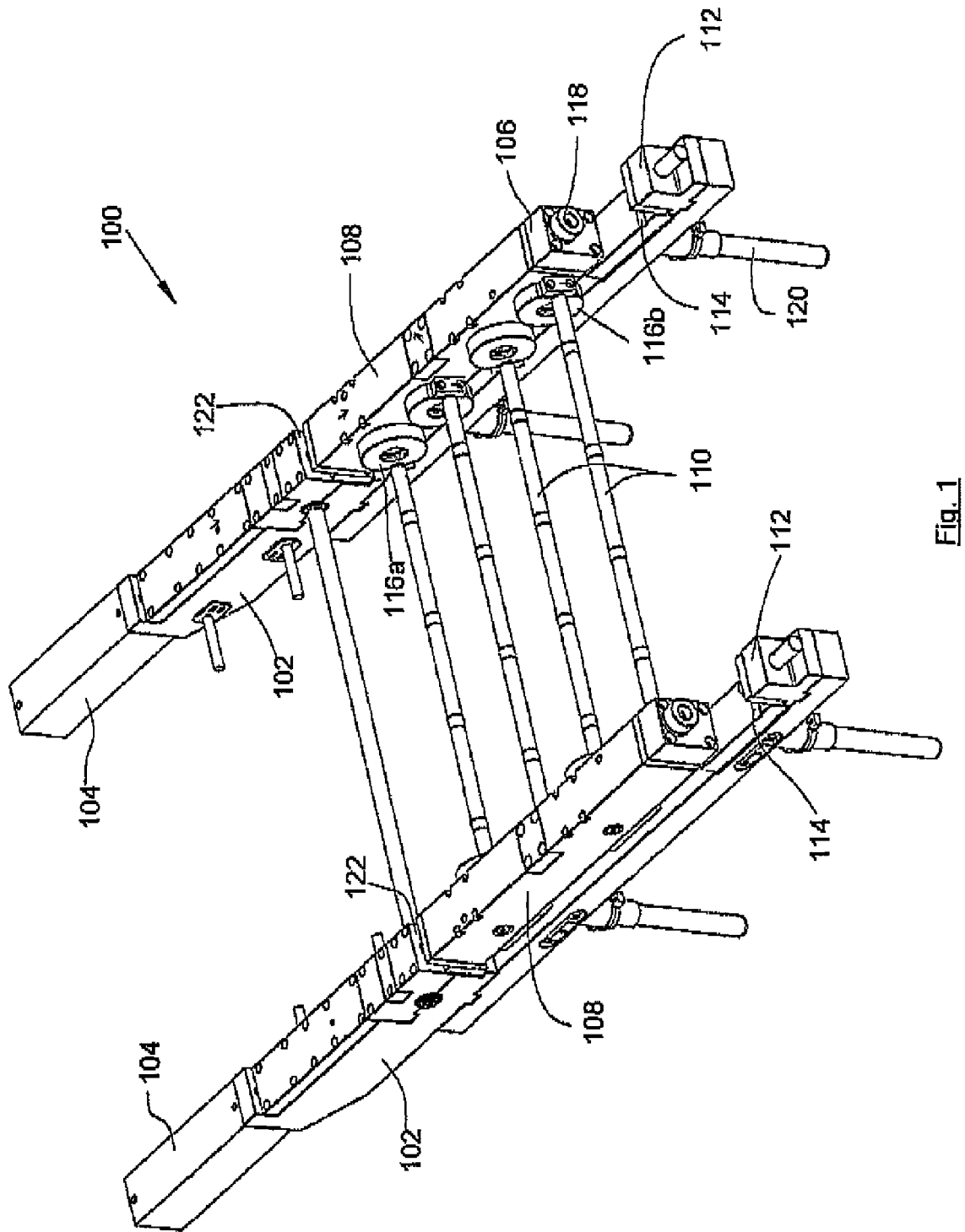
FIG. 1 depicts a closure system for molded caps according to the invention.

FIG. 1 depicts a closure system 100 for molded caps that is used in cooperation with an injection press. The closure system comprises a base comprising two parallel guide rails 102. Each guide rail 102 is here mounted on two fixing bars 120 that fix the closure system 100 to the injection press.

The closure system 100 comprises, for each guide rail 102, a movable carriage 108. Each carriage 108 is able to move in translation longitudinally along the guide rail 102 in question between a downstream stop 122 and an upstream stop 112. Each carriage 108 is guided in translation on the guide rail 102 in question by any suitable devices and the stops 112 and 122 are disposed so as to allow the movement of each carriage 108 over an appropriate distance, as will be more clearly understood subsequently.

The two carriages 108 are disposed facing each other and are connected together by one or more closure bars 110. Each closure bar 110 is in the form of a rectilinear bar, here cylindrical, which extends between the two carriages 108 perpendicular to the direction of movement of the carriages 108. The number of closure bars 110 varies according to the number of lines of caps that are molded simultaneously by the injection press. Here four closure bars 110 are shown.

Each closure bar 110 is mounted so as to be able to move in rotation about a rotation axis parallel to the longitudinal direction of the closure bar 110 but which is not merged with the axis of said closure bar 110. In other words, the rotation axis is perpendicular to the direction of movement of the carriages 102.

For this purpose, for each closure bar 110, a wheel 116a, 116b is mounted so as to be able to move in rotation on each carriage 108. The end of each closure bar 110 is fixed to the periphery of the wheel 116a, 116b in question, that is to say offset with respect to the rotation axis. Each wheel 116a, 116b is able to move in rotation about its axis, which constitutes the rotation axis. Each closure bar 110 is therefore subject to a rotation movement about the axis of the wheel 116a, 116b that carries it. As explained below, each closure bar 110 and therefore each wheel 116a, 116b moves between a first position in which the cap is open and a second position in which the cap is closed. The wheel in the first position is referenced 116a and the wheel in the second position is referenced 116b.

As explained below, each carriage 108 is set in movement by a rack whose end 118 is visible in FIG. 1. Each rack is set in movement by an activation device, which is described below as a pneumatic cylinder 104 fixed to the guide rail 102 in question but which may be a hydraulic, electrical or other cylinder. Each rack moves parallel to the rail 102.

Each guide rail 102 comprises a locking device 106, the function of which is described below and which cooperates with locking grooves. Each locking device 106 is designed to lock the carriage 108 alternately with the rack 208 and the guide rail 102.

FIG. 9 depicts an embodiment of the molding cavities for a cap. The body 204 is molded from a first cavity 902 that molds the top part of the body 204 and a second cavity 904 that molds the bottom part of the body 204, that is to say the part that is intended to fit subsequently on the bottle. The lid 206 is produced from the first cavity 902, which conforms the internal part of the lid 206, that is to say the part that is closed on the body 204, and a third cavity 904 that conforms the external part of the lid 206.

After the caps are molded, firstly, the first cavity 902 is moved in the direction of the arrow 908 so as to leave clear the space in which the lid 206 will pivot, and secondly the third cavity 904 is moved in the direction of the arrow 910 so as to leave clear the space in which the closure bar 110 will move. The caps are therefore no longer held except by the body 204, which is in engagement with the second cavity 906.

FIGS. 2 to 8 present the successive operating steps of the closure system 100.

FIG. 2 depicts the closure system 100 after the molding of the caps, which have a body 204, a hinge and a lid 206 in the open position, and after release of the first cavity 902 and the third cavity 904.

The pneumatic cylinder 104 has a first inlet 210 and a second inlet 212. Each inlet 210, 212 is designed to be connected to a pressurised air source in order to activate the pneumatic cylinder 104. The use of air rather than oil avoids, in the case of leakage, contamination of the workstation with oil.

The pneumatic cylinder 104 cooperates with the rack 208. The admission of air in the first inlet 210 causes the movement of the rack in a first direction and the admission of air in the second inlet 212 causes the movement of the rack in a second direction.

A guide gear 218 is mounted on the guide rail 102 and meshes with the teeth on the rack 208.

Each wheel 116a is secured to a maneuvering gear 214 able to move in rotation about the rotation axis and coaxial with said wheel 116a. Each maneuvering gear 214 meshes with the teeth on the rack 208.

The locking device 106 comprises a latch 202, a first locking groove 216 produced on the rack 208 and a second locking groove 114. The latch 202 engages alternately in the first locking groove 216 and in the second locking groove 114, so as to lock the carriage 108 alternately with the rack 208 and the guide rail 102. During the step in FIG. 2, the latch 202 is locked with the first locking groove 216, fixing the rack 208 and the carriage 108 together. The latch 202 is in the form of an oblong element, each end with radius of which cooperates with one of the locking grooves 114, 216. When a first end with radius cooperates with the first locking groove 216, the second end with radius slides over a surface of the guide rail 102. When the second end with radius cooperates with the second locking groove 114, the first end with radius slides over a surface of the rack 208.

During the step shown in FIG. 3, the air is admitted (arrow 302) in the first inlet 210 of the pneumatic cylinder 104, which thus pushes the rack 208 (arrow 304). As the latch 202 is locked with the first locking groove 216 by abutment of the second end with radius on the surface of the guide rail 102, the carriage 108 moves in translation on the guide rail 102 (arrow 306) and comes into abutment against the upstream stop 112. Each closure bar 110 is in a first position, that is to say under the lid 206.

During the step shown in FIG. 4, the air is admitted (arrow 302) in the first inlet 210 of the pneumatic cylinder 104, which thus continues to push the rack 208 (arrow 304). The latch 202 is released from the first locking groove 216 and locks with the second locking groove 114 (arrow 402) by abutment of the first end with radius on the surface of the rack 208.

During the step shown in FIG. 5, the air is admitted (arrow 302) in the first inlet 210 of the pneumatic cylinder 104, which thus continues to push the rack 208 (arrow 304).

As the latch 202 is released from the first locking groove 216, the rack 208 continues to advance. As the latch 202 is locked with the second locking groove 114, the carriage 108 remains immobile. The continuation of the movement of the rack 208 causes the rotation of the maneuvering gears 214 and therefore the rotation of the wheels 116b (arrow 502), which then reach the second position and cause the rotation of the closure bars 110, which also pass into a second position. During its rotation, each closure bar 110 comes into contact with the lid 206 and drives it in rotation about the hinge in order to close it and engage it on the body 204.

The position of the upstream stop 112 is therefore designed so that, when the closure bars 110 rotate, the rotation axis of each closure bar 110 is substantially merged with the axis of the hinge of the caps that it is to close.

During the step shown in FIG. 6, the air is admitted (arrow 602) in the second inlet 212 of the pneumatic cylinder 104, which thus draws the rack 208 (arrow 604). As the latch 202 is locked with the second locking groove 114, the carriage 108 remains immobile and the rack 208 moves without moving the carriage 108.

The movement of the rack 208 causes the rotation of the maneuvering gears 214 and therefore the rotation of the wheels 116a (arrow 608), which then return to the first position and cause the rotation of the closure bars 110.

During the step shown in FIG. 7, the air is admitted (arrow 602) into the second inlet 212 of the pneumatic cylinder 104, which thus continues to draw the rack 208 (arrow 604). The latch 202 is released from the second locking groove 114 and locks with the first locking groove 216 (arrow 702).

During the step depicted in FIG. 8, the air is admitted (arrow 602) in the second inlet 212 of the pneumatic cylinder 104, which thus continues to draw the rack 208 (arrow 604). As the latch 202 is locked with the first locking groove 216, the carriage 108 moves in translation on the guide rail 102 (arrow 606) and comes into abutment against the downstream stop 122.

The caps thus closed can be ejected and a new cycle of injection/molding, of closure of the caps and of ejection can take place.

The design of the closure system 100 is particularly simple and its functioning is easy to manage since there is, per guide rail 102, only one element to be controlled, this being the pneumatic cylinder 104.

Thus, for each rack 208, the activation device 104 moves the rack 208, firstly in the first direction 304 so as to bring each carriage 108 in abutment against its upstream stop 112 when the locking device 106 locks the carriage 108 with the rack 208, and then, when the locking device 106 locks the carriage 108 with the guide rail 102, so as to make each maneuvering gear 214 undergo a rotation that brings each closure bar 110 from the first position to the second position, a movement during which each closure bar 110 drives the lid 206 from the open position to the closed position, and secondly in the second direction 604 so as, when the locking device 106 locks the carriage 108 with the guide rail 102, to make each maneuvering gear 214 undergo a rotation that returns each closure bar 110 from its second position to its first position, and then, when the locking device 106 locks the carriage 108 with the rack 208, so as to bring each carriage 108 into abutment against its downstream stop 122.

After the molding of the caps 204, 206 and the release of the first cavity 902 and the third cavity 904, the process of closing the caps 204, 206 comprises:

- a step of moving in translation of the carriages 108 and the closure bars 110, which are connected there and are in a first angular position corresponding to the first position of the wheels 116a,
- a step of stopping the movement when the closure bars 110 are correctly positioned with respect to the lids 206 that they are to close, that is to say substantially below the lids 206, this position corresponding to the putting of the carriages 108 in abutment against the upstream stops 112,
- a step of rotating the closure bars 110, which pass into a second angular position corresponding to the second position of the wheels 116b,
- a step of stopping the rotation when the closure bars 110 have turned sufficiently to close the lids 206,
- a step of rotating in a reverse direction of rotation,
- a step of stopping the rotation in the reverse direction when the closure bars 110 have returned to the first angular position,
- a step of moving the carriages 108 and closure bars 110 in translation in a direction opposite to the first movement step, and
- a step of stopping the movement when the carriages are in abutment against the downstream stops 122.

The cap thus closed can then be ejected from the second cavity 906.

Naturally the present invention is not limited to the examples and embodiments depicted but is capable of numerous variants accessible to persons skilled in the art.

The invention claimed is:

1. A closure system (100) for molded caps formed by a body (204), a lid (206) and a hinge, the closure system (100) comprising:
   (a) two parallel guide rails (102);
   (b) for each guide rail (102), a carriage (108) mounted so as to be able to move in translation on the guide rail (102) between a downstream stop (122) and an upstream stop (112);
   (c) at least one closure bar (110) disposed between the two carriages (108);
   (d) for the or each closure bar (110), two wheels (116a, 116b), each being mounted on one of the carriages (108), able to move in rotation about a rotation axis perpendicular to the direction of movement of the carriages (102) and each end of said closure bar (110) being mounted on one of the wheels (116a, 116b) so as to be off-center with respect to said rotation axis;
   (e) for each carriage (108), a rack (208) designed to move parallel to said guide rail (102);
   (f) for each wheel (116a, 116b), a maneuvering gear (214) able to move in rotation about said rotation axis, secured to and coaxial with said wheel (116a, 116b) and designed to mesh with the rack (208);
   (g) for each carriage (108), a locking device (106) designed to lock said carriage (108) alternately with the rack (208) and the guide rail (102); and
   (h) for each rack (208), an activation device (104) designed to move said rack (208) firstly in a first direction (304) so as to bring each carriage (108) in abutment against its upstream stop (112) when the locking device (106) locks said carriage (108) with the rack (208), and then, when the locking device (106) locks said carriage (108) with said guide rail (102), so as to make each maneuvering gear (214) undergo a rotation that brings each closure bar (110) from a first position to a second position, a movement during which each closure bar (110) drives the lid (206) from the open position to the closed position, and secondly in a second direction (604) so as, when the locking device (106) locks said carriage (108) with said guide rail (102), to make each maneuvering gear (214) undergo a rotation movement (214) that returns each closure bar (110) from its second position to its first position, and then, when the locking device (106) locks said carriage (108) with the rack (208), so as to bring each carriage (108) in abutment against its downstream stop (122).

2. The closure system (100) of claim 1, characterised in that, at the time of rotation of the closure bars (110), for each closure bar (110), the rotation axis of the closure bar (110) is substantially merged with the axis of the hinge of the caps (204, 206) that are closed by said closure bar (110).

3. The closure system (100) of claim 1, characterised in that the locking device (106) comprises a latch (202), a first locking groove (216) produced on the rack (208) and a second locking groove (114) produced on the guide rail (102), and in that the latch (202) is designed to engage alternately in the first locking groove (216) or the second locking groove (114).

4. The closure system (100) of claim 3, characterised in that the latch (202) is in the form of an oblong element and in that, when a first end with radius cooperates with the first locking groove (216), the second end with radius is in abutment on a surface of the guide rail (102), and in that, when the second end with radius cooperates with the second locking groove (114), the first end with radius is in abutment on a surface of the rack (208).

5. The closure system (100) of claim 1, characterised in that each activation device (104) is a pneumatic cylinder.

* * * * *